US012526330B1

(12) United States Patent
Yu

(10) Patent No.: US 12,526,330 B1
(45) Date of Patent: Jan. 13, 2026

(54) ADJUSTING A CONFIGURATION ASSOCIATED WITH A VIDEO OUTPUT DURING A VIDEO CONFERENCE

(71) Applicant: Zoom Communications, Inc., San Jose, CA (US)

(72) Inventor: Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 163 days.

(21) Appl. No.: 18/319,799

(22) Filed: May 18, 2023

Related U.S. Application Data

(63) Continuation of application No. 17/588,590, filed on Jan. 31, 2022, now abandoned.

(51) Int. Cl.
*H04L 65/75* (2022.01)
*H04L 65/403* (2022.01)

(52) U.S. Cl.
CPC .......... *H04L 65/762* (2022.05); *H04L 65/403* (2013.01)

(58) Field of Classification Search
CPC ............................ H04L 65/762; H04L 65/403
See application file for complete search history.

(56) References Cited

U.S. PATENT DOCUMENTS

| | | | |
|---|---|---|---|
| 7,559,026 B2 | 7/2009 | Girish et al. | |
| 7,676,146 B2 | 3/2010 | Border et al. | |
| 8,593,564 B2 | 11/2013 | Border et al. | |
| 9,097,961 B2 | 8/2015 | Kishida et al. | |
| 10,298,834 B2 | 5/2019 | Pitts et al. | |
| 11,743,475 B2* | 8/2023 | Bryant | H04N 19/182 375/240.12 |
| 2006/0238445 A1* | 10/2006 | Wang | H04N 19/177 345/55 |
| 2008/0129844 A1* | 6/2008 | Cusack | H04N 23/80 348/241 |
| 2012/0274736 A1* | 11/2012 | Robinson | H04N 7/15 348/E7.083 |
| 2013/0201345 A1* | 8/2013 | Ling | H04N 23/611 348/169 |
| 2015/0124117 A1* | 5/2015 | Tian | H04N 23/73 348/223.1 |
| 2018/0241882 A1* | 8/2018 | Lee | H04N 7/147 |
| 2021/0044734 A1* | 2/2021 | Tangeland | H04N 23/611 |

FOREIGN PATENT DOCUMENTS

WO 2016101481 A1 6/2016

* cited by examiner

*Primary Examiner* — Phung-Hoang J Nguyen
(74) *Attorney, Agent, or Firm* — Young Basile Hanlon & MacFarlane, P.C.

(57) ABSTRACT

A client application associated with a communications system may connect to a video conference. The communications system may include a microphone that generates an audio output and a camera that generates a video output. During the video conference, a trigger event may be detected. The trigger event may be associated with the camera. Responsive to detecting the trigger event, a configuration associated with the video output may be adjusted.

20 Claims, 13 Drawing Sheets

ADJUSTING A CONFIGURATION ASSOCIATED WITH A VIDEO OUTPUT DURING A VIDEO CONFERENCE

CROSS-REFERENCE TO RELATED APPLICATION(S)

This application is a continuation of U.S. patent application Ser. No. 17/588,590, filed Jan. 31, 2022, titled "Adjusting A Configuration Associated With A Video Output During A Video Conference," the entire disclosure of which is hereby incorporated by reference.

FIELD

This disclosure relates generally to communication management and, more specifically, to adjusting a configuration associated with a video output during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
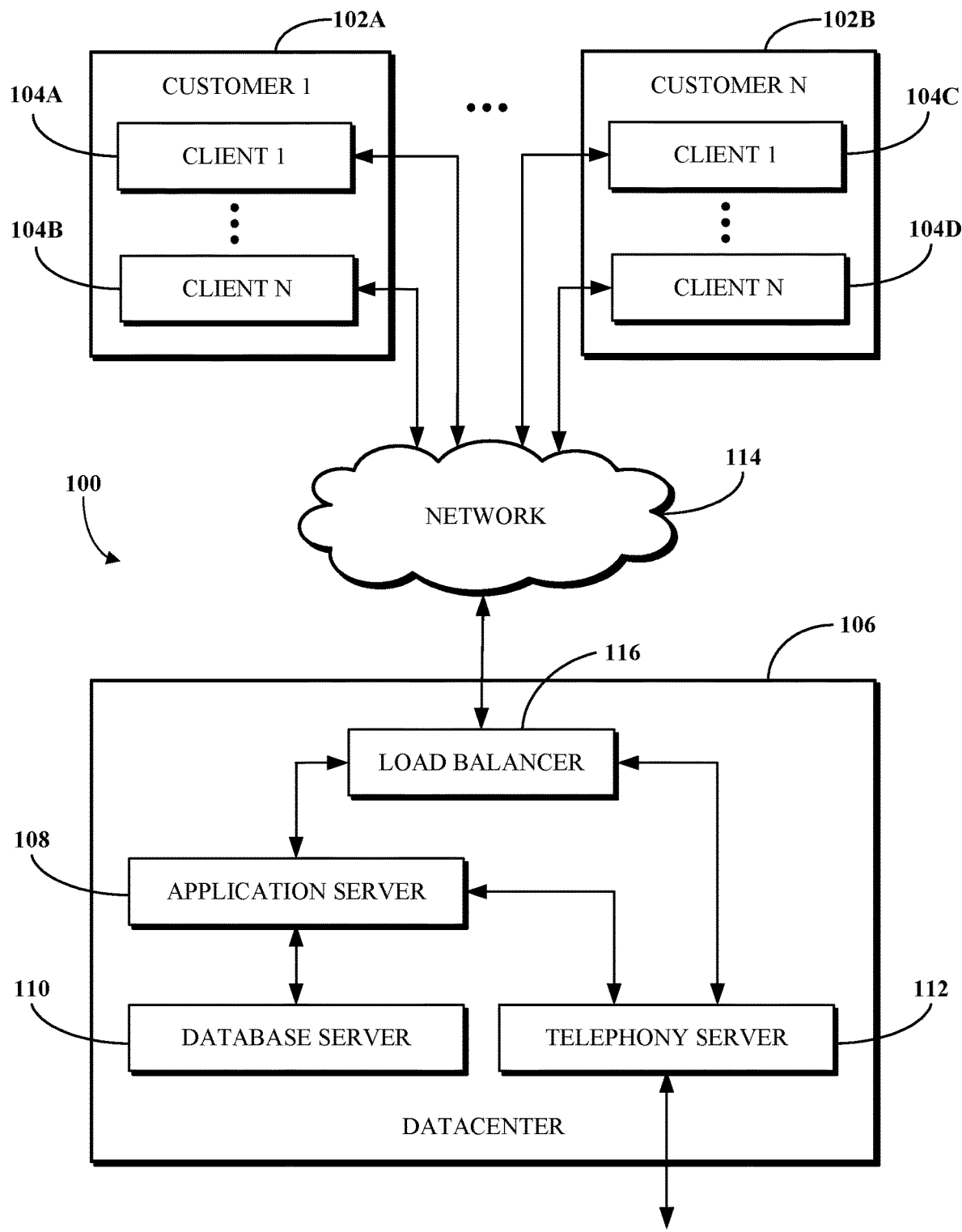
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these is a unified communications as a service (UCaaS) platform, which includes several communications services integrated over a network, such as the Internet, to deliver a complete communication experience regardless of physical location.

A software platform such as a UCaaS platform may permit video conferencing between participants at remote locations. During a video conference, video is captured for the participants at their respective devices (e.g., cameras), processed at a server implementing conferencing software for the video conference, and then output to all participant devices for the users thereof to see. In some cases, a participant of the video conference may at some point wish to change the view represented in their video output for other participants to see. For example, the participant may wish to change the view of their camera so that other participants see an object, such as a document in hand or on a table, instead of the participant's face. If the user changes the view of their camera, such as to show the object, the video output may not display properly. For example, when changing the view from the participant's face to the object, the object could possibly appear inverted and/or out of focus. Further, the object could possibly be obscured by a virtual background implemented by the participant. As a result, the participant may have to adjust one or more configurations of the video output to properly display the view. However, without knowledge of how to accurately resolve this problem, and further without a proper resolution of the underlying issues, this may cause difficulty and disruption for the participants of the video conference.

Implementations of this disclosure address problems such as these by providing a system for adjusting a configuration associated with a video output during a video conference. The system detects a trigger event (e.g., a gesture) during a video conference. The trigger event may be detected by a client application connected to conferencing software implementing the video conference. The client application may be associated with a communications system that is used during the video conference. The communications system may include a camera that generates a video output and a microphone that generates an audio output. In some implementations, the trigger event may be associated with the camera. For example, the trigger event could comprise receiving an input from a sensor indicating a movement of the camera, detecting a change in an image of the video output indicating a movement of the camera, and/or detecting an audio statement via the microphone, which may be in connection with the video output. The trigger event may cause a configuration (e.g., a setting) associated with the video output from the camera to be adjusted. For example, adjusting a configuration could comprise changing a focal point associated with the camera, inverting an image of the video output, changing a virtual background associated with the video output, changing a contrast, sharpness, and/or saturation in an image of the video output, activating a light associated with a camera, and the like. In some implementations, a machine learning model may be trained to detect the trigger event and/or to adjust the configuration associated with the video output. As a result, a camera may be more effectively used during a video conference with reduced difficulty and disruption for the participants. This feature may require authorization of account administrator prior to use.

To describe some implementations in greater detail, reference is first made to examples of hardware and software structures used to implement a system to adjust a configuration associated with a video output during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
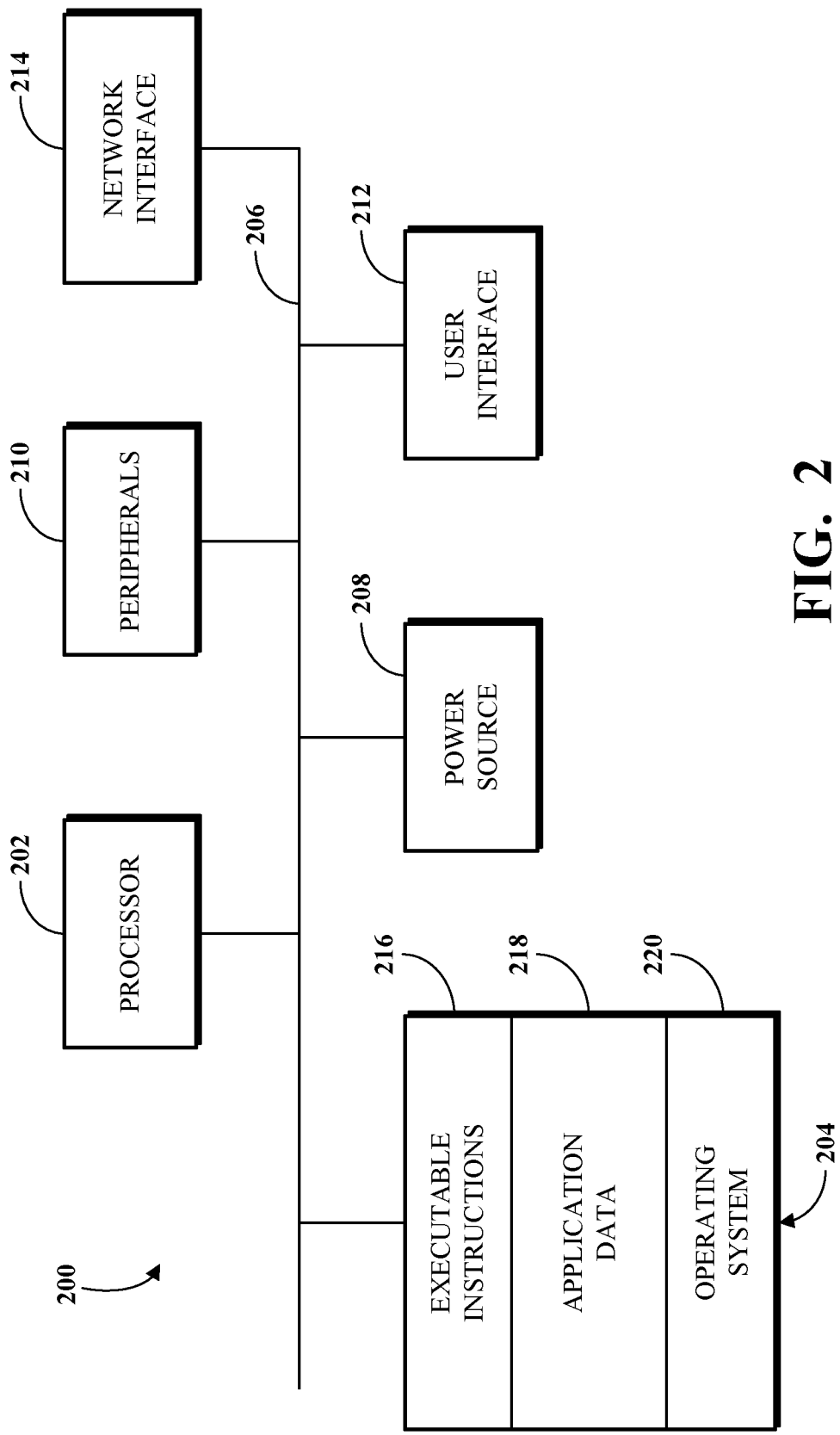
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
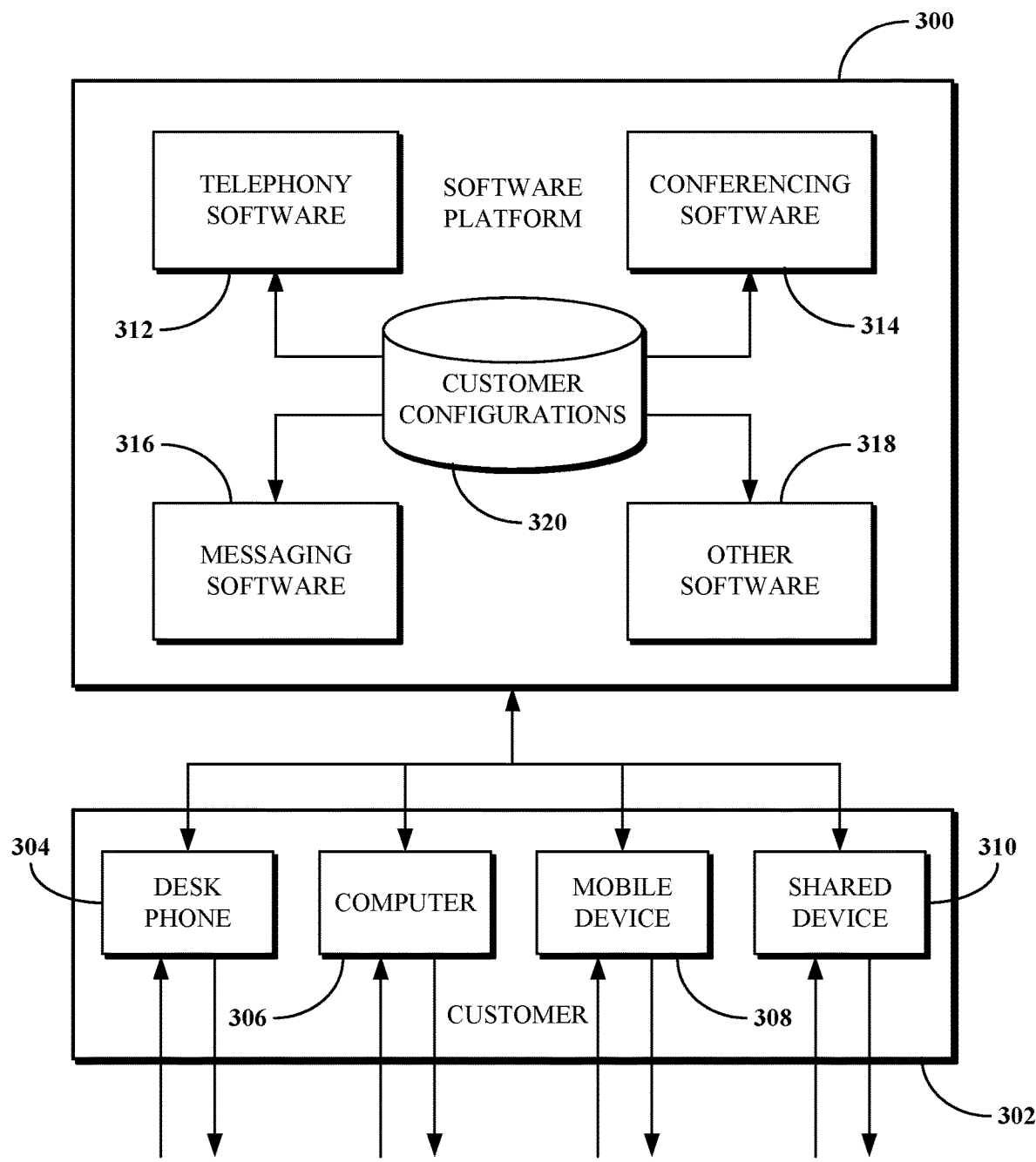
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for adjusting a configuration associated with a video output during a video conference. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
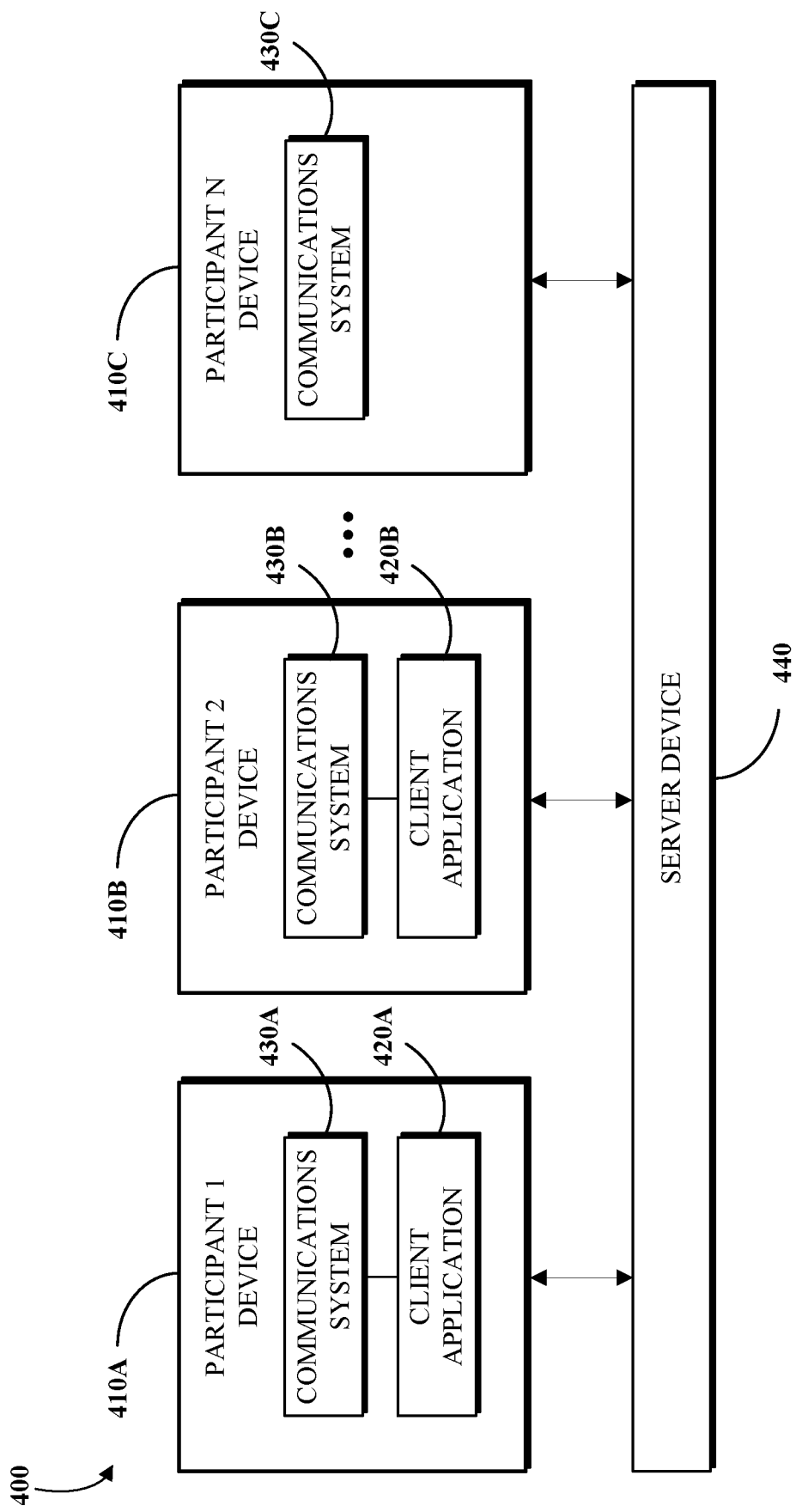
FIG. 4 is a block diagram of a system for adjusting a configuration associated with a video output during a video conference.

FIG. 4 is a block diagram of a system 400 for adjusting a configuration associated with a video output during a video conference. The system 400 may include one or more participant devices at remote locations, such as participant devices 410A through 410C. For example, a participant device could be a client device such as one of the clients 304 through 310 shown in FIG. 3. A participant device may execute software including a client application, such as participant device 410A executing client application 420A and participant device 410B executing client application 420B. The client application may be used to connect a participant device to a video conference which may include other participant devices. For example, the client application 420A may be used to connect the participant device 410A to a video conference, and the client application 420B may be used to connect the participant device 410B to the same video conference. In some implementations, a participant device may connect to the video conference by using conferencing software at a server (e.g., over a web application). For example, participant device 410C may connect to the video conference by using conferencing software at server device 440.

A participant device may also include a communications system, such as participant device 410A including communications system 430A, participant device 410B including communications system 430B, and participant device 410C including communications system 430C. A client application may use the communications system to communicate with other participants during a video conference, such as client application 420A using communications system 430A to communicate with participant devices 410B and 410C. A communications system may include one or more microphones, one or more cameras, one or more speakers, and/or one or more user interfaces. A communications system may generate an audio output via the one or more microphones and/or a video output via the one or more cameras. A communications system may also receive an audio input via the one or more speakers and/or a video input via the one or more user interfaces.

The one or more participant devices (e.g., the participant device 410A through 410C) may connect to the server device 440. The server device 440 may run software including conferencing software configured to support a video conference between participant devices. For example, the server device 440 could be a server at the datacenter 106 shown in FIG. 1. The server device 440 may run conferencing software such as the conferencing software 314 shown in FIG. 3, and the participant devices 410A, 410B, and 410C may connect to the video conference over the conferencing software. In operation, participants may connect to a video conference via respective participant devices, such as participant devices 410A, 410B, and 410C. A participant device could be operated by single user (e.g., the participant) or multiple users (e.g., multiple participants), such as at a remote geographic location.

During a video conference, a participant (e.g., a user of participant device 410A) may wish to provide a different view for other participants to see. For example, the participant may wish to change the view of their camera (e.g., of the communications system 430A) so that other participants may see an object close up, such as a document in hand or on a table, instead of the participant's face. Accordingly, in some implementations, a client application (e.g., the client application 420A) of the participant's device (e.g., the participant device 410A) may be used to detect a trigger event (e.g., a gesture) associated with a camera of the communications system (e.g., the communications system 430A). For example, the trigger event could comprise receiving an input from a sensor indicating a movement of the camera, detecting a change in an image of the video output indicating a movement of the camera, and/or detecting an audio statement via the microphone. The trigger event may cause a configuration (e.g., a setting) associated with the video output from the camera to be adjusted. For example, adjusting a configuration could comprise changing a focal point associated with the camera, inverting an image of the video output, changing a virtual background associated with the video output, changing a contrast, sharpness, and/or saturation in an image of the video output, activating a light associated with the camera, and the like. As a result, participants may use their cameras more effectively during a video conference with reduced difficulty and disruption.

In some implementations, a message may be sent to the participant to obtain feedback. For example, the message may include one or more screenshots or images captured by the camera (e.g., a camera of the communications system 430A) during the video conference. In some implementations, the message could be sent to the participant (e.g., a user of participant device 410A) from the server device (e.g., the server device 440) after ending a video conference. The message may indicate how a configuration associated with the video output was adjusted, such as by showing examples of screenshots or images obtained during the video conference. In some implementations, the message may indicate how a trigger event caused an adjustment to the configuration associated with the video output. The message may permit the participant to view the images and provide input as to whether the images were captured correctly or incorrectly and/or whether the trigger event was detected correctly or incorrectly. For example, the feedback may be provided by replying to the message, or by accessing a website associated with the message. The feedback may then be used (e.g., by the client application 420A) to improve adjusting the configuration associated with the video output, such as for a next video conference.

In some implementations, the client application (e.g., the client application 420A) may execute or otherwise use a machine learning model, such as when detecting the trigger event and/or adjusting the configuration. In other words, the machine learning model may be used to set up a behavior to capture a participant's intent. For example, the machine learning model may be trained to determine whether a movement of a camera and/or a change in an image of the video output (e.g., a movement of an object) should automatically cause a trigger event. In some implementations, the machine learning model may be trained to adjust the configuration associated with the video output. In some implementations, the machine learning model may be trained based on feedback from the participant.

Figure 5:
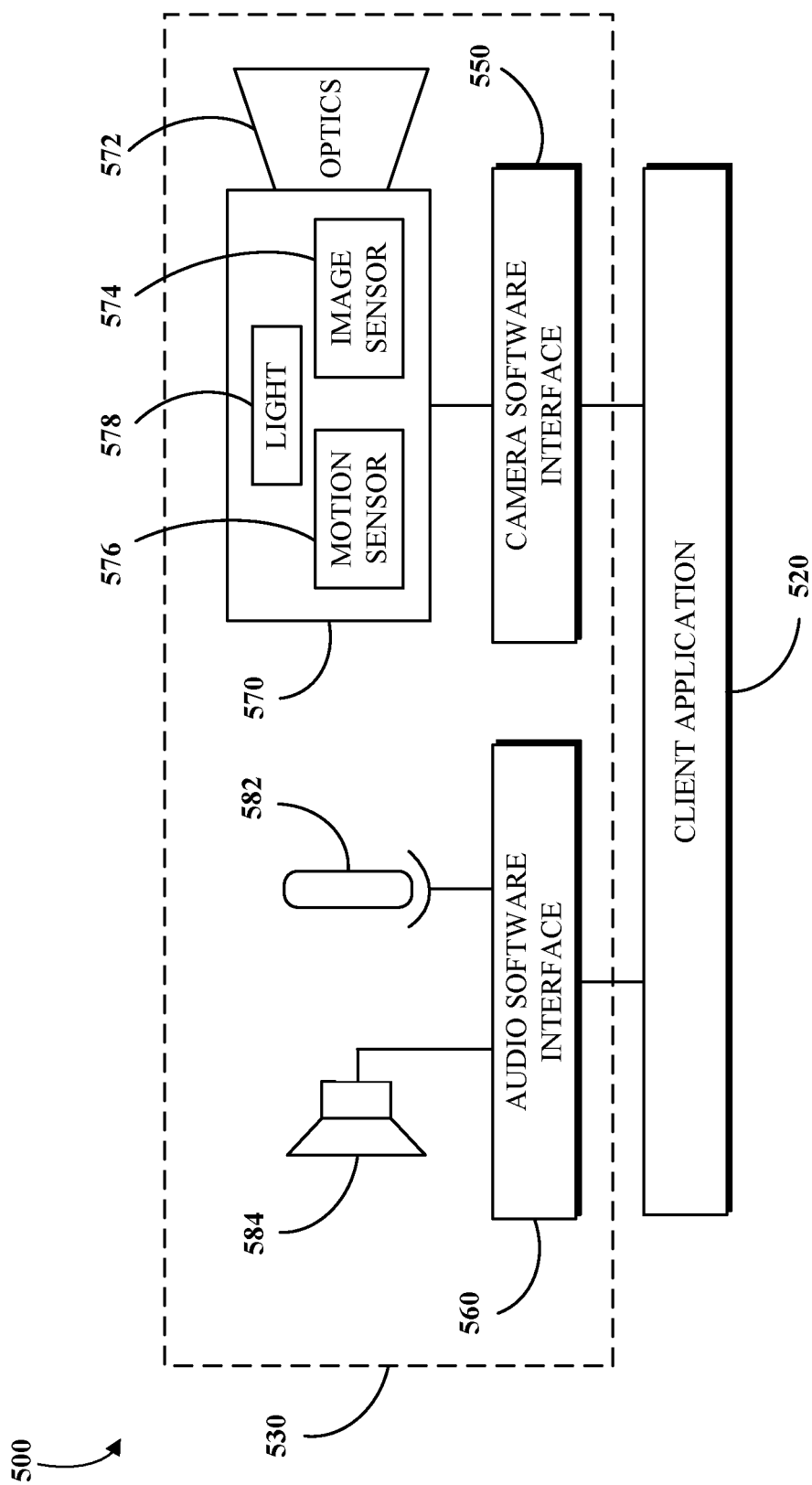
FIG. 5 is a block diagram of an example of a system including a client application and a communications system.

FIG. 5 is a block diagram of an example of a system 500 including a client application 520 and a communications system 530. The client application 520 and the communications system 530 could be like the client application and the communications system of a participant device shown in FIG. 4 (e.g., the client application 420A and the communications system 430A of the participant device 410A). The communications system 530 may include a camera software interface 550 and/or an audio software interface 560. For example, the camera software interface 550 and/or the audio software interface 560 could comprise software that is executed by a participant device like the participant device 410A shown in FIG. 4. The camera software interface 550 and/or the audio software interface 560 could be implemented separately or as a single software interface. The client application 520 may communicate with the camera software interface 550 and/or the audio software interface 560, such as via one or more application program interfaces (APIs).

The camera software interface 550 may be used to control, and/or interface with, a camera 570 of the communications system. The camera 570 may include optics 572 (e.g., lenses), an image sensor 574, a motion sensor 576, and/or a light 578. The camera 570 may be used to capture images from a participant of a video conference which may be used to generate a video output. The optics 572 may be used to control a focal point associated with the camera (e.g., to control zooming in and/or zooming out or to focus on a specific object). The image sensor 574 may be used to capture raw images received through the optics 572. For example, the image sensor 574 could comprise a complementary metal oxide semiconductor (CMOS) image sensor or charge-coupled device (CCD) image sensors. The motion sensor 576 may be used to detect a movement of the camera. In some implementations, the motion sensor 576 could comprise a gyroscope. The light 578 may be used to illuminate a field of view for improved capture by the camera. In some implementations, the light 578 may comprise one or more light emitting diodes (LEDs).

The audio software interface 560 may be used to control, and/or interface with, a microphone 582 and/or a speaker 584 of the communications system. The microphone 582 may be used to capture sound from a participant of a video conference which may be used to generate an audio output for the video conference. The speaker 584 may be used to produce sound for a participant during a video conference, such as from an audio input generated by the video conference. In some implementations, the microphone 582 and/or the speaker 584 may be integrated with the camera 570.

The client application 520 may use the camera software interface 550 and/or the audio software interface 560 to interface with the camera 570, the microphone 582, and/or the speaker 584. For example, the client application 520 may pass instructions or commands to the camera 570, the microphone 582, and/or the speaker 584 via the camera software interface 550 and/or the audio software interface 560. In some implementations, the client application 520 may communicate with the camera software interface 550 and/or the audio software interface 560 to detect a trigger event. For example, the client application 520 may receive an input from the camera software interface 550 (e.g., via an API). The input could be caused by the motion sensor 576 producing a signal indicating movement of the camera 570 (e.g., the participant moving the camera 570). In some implementations, the client application 520 may communicate with the camera software interface 550 to monitor for a change in an image of the video output indicating a movement of the camera 570 (e.g., monitor a video stream).

In some implementations, the client application 520 may communicate with the audio software interface 560 to detect a trigger event. For example, the client application 520 may receive an input from the audio software interface 560 (e.g., via an API). The input could be caused by the audio software interface 560 capturing a predetermined audio statement. In some implementations, the audio statement could cause a trigger event associated with the video output. Examples of audio statements that could cause a trigger event may include: "zoom in" (e.g., an audio statement indicating the camera 570 should zoom in to an image); "zoom out" (e.g., an audio statement indicating the camera 570 should zoom out from an image); "re-focus" (e.g., an audio statement indicating the camera 570 should change focus from one region of interest in an image to another region of interest, such as in a ranked or prioritized order of possible regions of interest as determined by object recognition software); "snapshot" (e.g., an audio statement indicating an image of the video output should be saved, such as a screenshot); and "flashlight" (e.g., an audio statement indicating a light associated with the camera 570 should be activated or deactivated, such as the light 578). It should be appreciated that many different variations of such audio statements could be used, including in different languages, to achieve similar results.

In some implementations, the client application 520 may communicate with the camera software interface 550 and/or the audio software interface 560 to adjust a configuration associated with a video output, such as in response to detecting the trigger event. For example, the client application 520 may send an output to the camera software interface 550 to change a focal point associated with the camera 570 (e.g., to adjust the optics 572), to change a region of interest in an image of the video output (e.g., such as by enhancing one area of an image while blurring another of an image and/or by zooming to a focal point), and/or to activate a light associated with the camera 570. In some implementations, the client application 520 may execute to adjust the configuration associated with the video output by inverting an image of the video output, changing a virtual background associated with the video output, and/or changing a contrast, sharpness, and/or saturation in an image of the video output.

Figure 6:
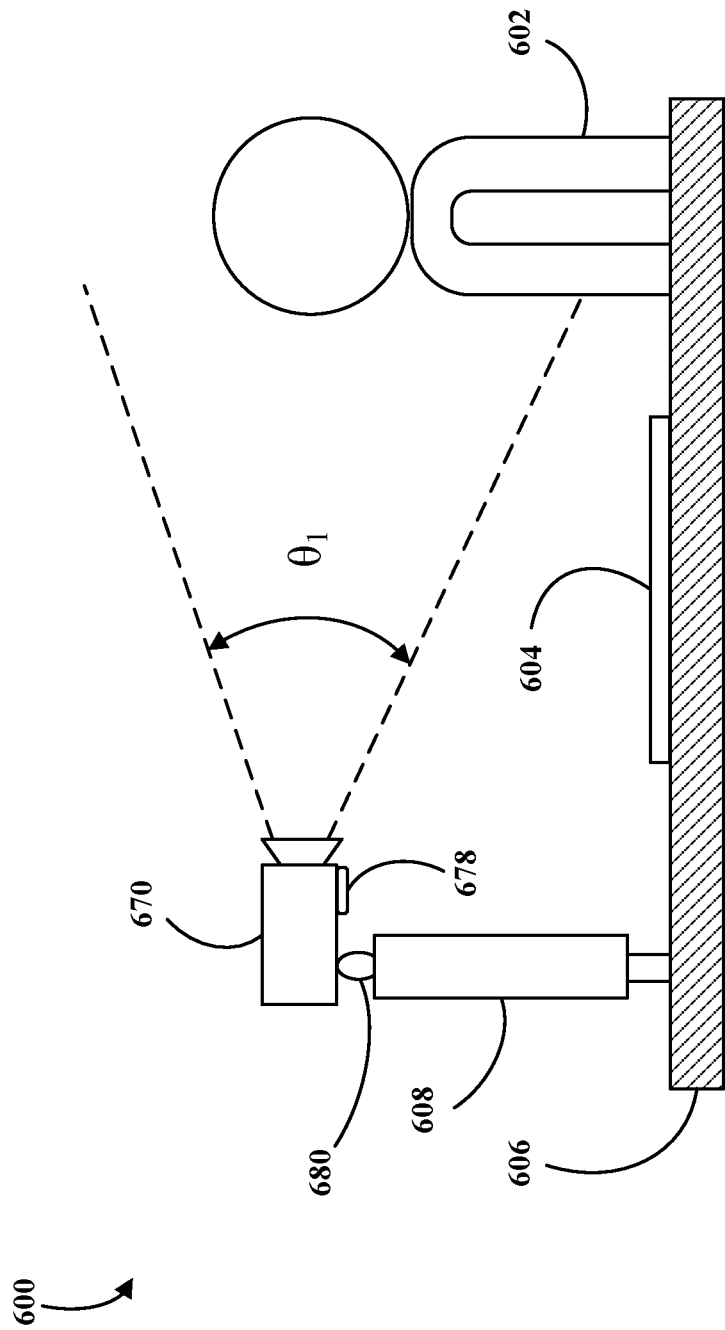
FIG. 6 illustrates an example of an environment in which a camera is used to capture images of a participant during a video conference.

FIG. 6 illustrates an example of an environment 600 in which a camera 670 is used to capture images of a participant 602 during a video conference. The camera 670 may be part of a communications system associated with a participant device like a communications system shown in FIG. 4 (e.g., the communications system 430A associated with the participant device 410A). For example, the environment 600 could include the participant 602 in front of the camera 670 with an object 604 below the participant 602 (e.g., on a table 606). The participant may be viewing the video conference (e.g., viewing other participants of the video conference, arranged in user tiles) via a user interface 608. The camera 670 may be attached to a mounting system 680.

During the video conference, the camera 670 may capture images in the environment 600 to generate the video output. A client application associated with the camera 670, which could be like a client application shown in FIG. 4 (e.g., the client application 420A), may execute to configure one or more parameters in connection with the video output (e.g., set a configuration associated with the video output). For example, the one or more parameters may control a focal point associated with the camera 670, an orientation of an image of the video output (e.g., inverted or not inverted), a keystone adjustment of an image of the video output, a virtual background associated with the video output (e.g., blurring a background around a focal point, such as blurring a background around the participant 602), a contrast, sharpness, and/or saturation of an image of the video output, a light 678 associated with the camera 670 (e.g., activated or deactivated), and/or the like. In some implementations, the keystone adjustment may correct any apparent distortion in an image of the video output that may be caused by capturing an object at an angle from the camera 670 (e.g., the "keystone effect"). For example, the keystone adjustment could comprise digital processing of the video output to correct the keystone effect, such as by implementing a non-proportional scaling that adjusts and/or re-maps images of the video output.

In the environment 600, the one or more parameters may be set in a configuration (e.g., setting) based on the camera 670 being oriented to capture images of the participant 602. For example, the configuration could include configuring the camera 670 in a first angle of view angle ("O1") (e.g., which may be a relatively wider angle of view) with a focal point (e.g., a depth of view) directed to the participant 602. The configuration could also include an orientation of an image of the video output that is not inverted. The configuration could also include a keystone adjustment of an image of the video output. The configuration could also include a virtual background associated with the video output that is activated (e.g., blurring a background around the participant 602). The configuration could also include a contrast, sharpness, and/ or saturation of an image of the video output that is optimized for a person (e.g., the participant 602). The configuration could also include deactivating the light 678 associated with the camera 670 (e.g., so that the participant 602 is not blinded by the light). In some implementations, the one or more parameters may comprise a default configuration.

Figure 7:
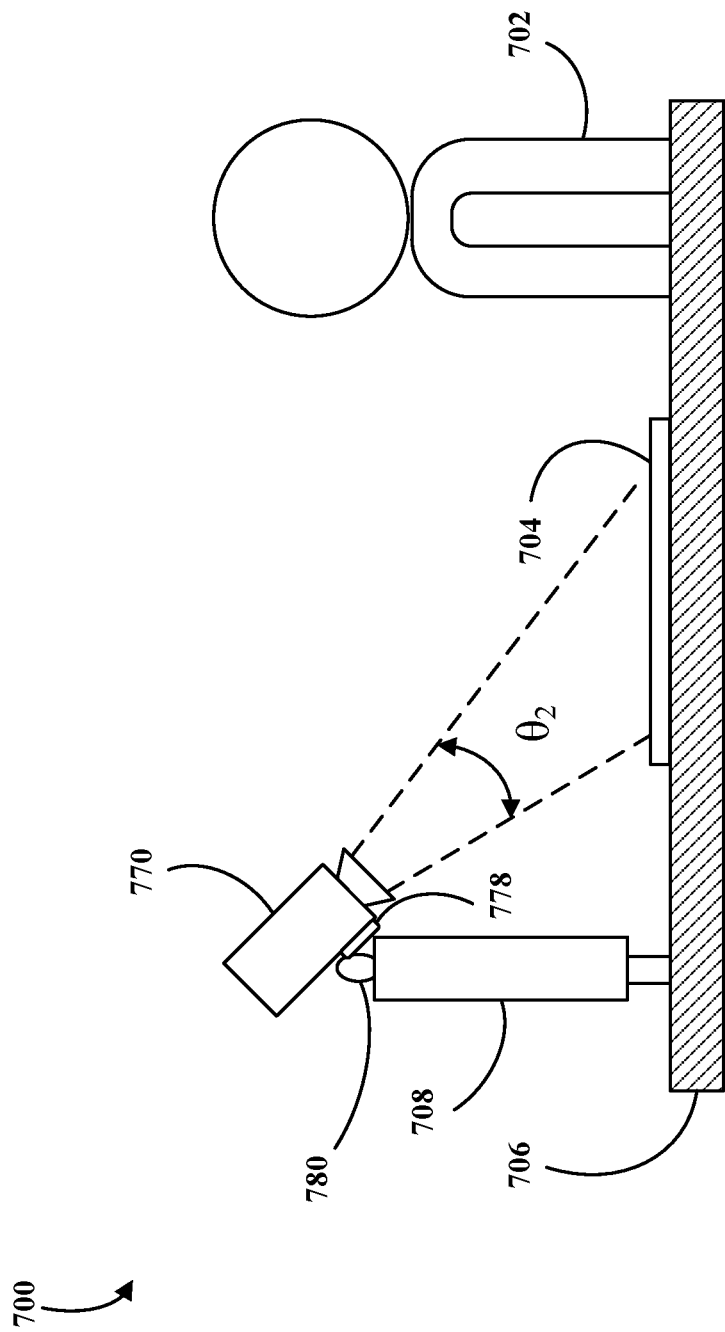
FIG. 7 illustrates an example of another environment in which a camera is used to capture images of an object below a participant during a video conference.

FIG. 7 illustrates an example of an environment 700 in which a camera 770 is used to capture images of an object 704 below a participant 702 during a video conference. The participant 702 may be viewing the video conference via a user interface 708. The environment 700 may be like the environment 600 shown in FIG. 6. For example, the camera 770 may be part of a communications system associated with a participant device like a communications system shown in FIG. 4 (e.g., the communications system 430A associated with the participant device 410A).

During a video conference, the participant 702 may wish to change a view of the camera 770. For example, the participant 702 may wish for other participants see the object 704, a document on the table 706, instead of the participant's face. The participant may move the camera 770 so that it is pointing downward to the object 704, as shown in FIG. 7, as opposed to upward toward the participant 702. For example, the participant 702 may move the camera 770 by rotating or pivoting the camera 770 with respect to a mounting system 780. A client application associated with the camera 770, which could be like a client application shown in FIG. 4 (e.g., the client application 420A), may execute to detect the movement of the camera 770 as a trigger event (e.g., gesture). In some implementations, the client application may detect the trigger event based on a motion sensor associated with the camera 770 indicating the movement. The sensor could be like the motion sensor 576 shown in FIG. 5. In some implementations, the client application may detect the trigger event based on detecting a change in an image of the video output indicating a movement of the camera 770. For example, the client application may execute object recognition software to detect the movement of the participant 702 upward in the image of the video output (e.g., and perhaps out of the image) and/or to detect the movement of the object 704 coming upward in the image of the video output (e.g., and partially or fully into the image).

Responsive to detecting the trigger event, the client application may execute to adjust one or more parameters in connection with the video output (e.g., adjust a configuration associated with the video output). In some implementations, the one or more parameters may be adjusted from a default configuration, such as adjusted from a configuration for the environment 600 shown in FIG. 6. In the environment 700, the one or more parameters may be adjusted so that they are set in a configuration based on the camera 770 being oriented to capture images of the object 704 below the participant 702. For example, the configuration could be adjusted to include configuring the camera 770 in a second angle of view angle ("$\theta_2$") (e.g., which may be a relatively narrower angle of view) with a focal point (e.g., a depth of view) directed to the object 704. In some implementations, this may permit improved viewing of text on a document. The configuration could also include an orientation of an image of the video output that is inverted (e.g., so that the document appears right side up). The configuration could also include executing a keystone adjustment with respect to the video output to correct any apparent distortion of the object 704 in an image of the video output (e.g., the keystone effect, which in the environment 700 may be caused by capturing the object 704 at an angle from the camera 770). For example, the keystone adjustment could comprise digital processing of the video output to correct the keystone effect, such as by implementing a non-proportional scaling that adjusts and/or re-maps images of the video output. The configuration could also include a virtual background associated with the video output being deactivated (e.g., no longer blurring a background in the image). The configuration could also include a contrast, sharpness, and/or saturation of an image of the video output that is optimized for the object 704 (e.g., optimized for text of a document). The configuration could also include activating a light 778 associated with the camera 770 (e.g., so that the document is illuminated).

Figure 8:
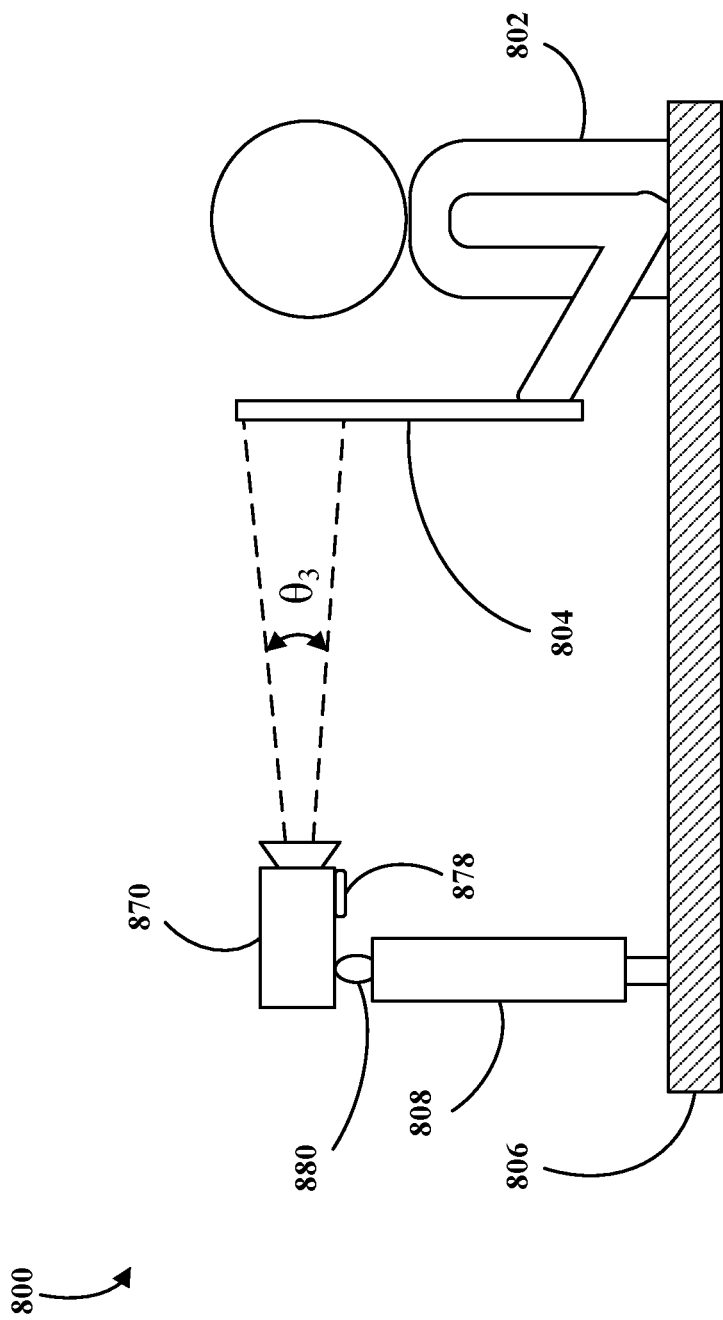
FIG. 8 illustrates an example of another environment in which a camera is used to capture images of an object in front of a participant during a video conference.

FIG. 8 illustrates an example of an environment 800 in which a camera 870 is used to capture images of an object 804 in front of a participant 802 during a video conference. The environment 800 may be like the environment 600 shown in FIG. 6. For example, the camera 870 may be part of a communications system associated with a participant device like a communications system shown in FIG. 4 (e.g., the communications system 430A associated with the participant device 410A). The environment 800 includes a table 806, a user interface 808, and a mounting system 880.

During a video conference, the participant 802 may wish to change a view of the camera 870. For example, the participant 802 may wish for other participants to see the object 804, a document in front of the participant 802, instead of the participant's face. The participant may move the object 804 so that it is in front of the camera 870 (e.g., without moving the camera). A client application associated with the camera 870, which could be like a client application shown in FIG. 4 (e.g., the client application 420A), may execute to detect the movement of the object 804 as a trigger event (e.g., gesture). In some implementations, the client application may detect the trigger event based on detecting a change in an image of the video output indicating a movement of the object 804. For example, the client application may execute object recognition software to detect the object 804 moving upward in the image of the video output (e.g., and partially or fully into the image) and/or to detect the participant 802 becoming less prominent in the image of the video output (e.g., becoming blocked, deemphasized, and/or reduced in size when compared to the object 804).

Responsive to detecting the trigger event, the client application may execute to adjust one or more parameters in connection with the video output (e.g., adjust a configuration associated with the video output). In some implementations, the one or more parameters may be adjusted from a default configuration, such as adjusted from a configuration for the environment 600 shown in FIG. 6. In the environment 800, the one or more parameters may be adjusted so that they are set in a configuration based on the camera 870 being oriented to capture images of the object 804 in front of the participant 802. For example, the configuration could include configuring the camera 870 in a third angle of view angle ("$\theta_3$") (e.g., which may be a relatively narrower angle of view) with a focal point (e.g., a depth of view) directed to the object 804. In some implementations, this may permit viewing text on a document. The configuration could also include an orientation of an image of the video output that is not inverted (e.g., so that a document appears right side up). The configuration could also include executing a keystone adjustment with respect to the video output to correct any apparent distortion of the object 804 in an image of the video output (e.g., the keystone effect, which in the environment 800 may be caused by capturing the object 804 at an angle from the camera 870). For example, the keystone adjustment could comprise digital processing of the video output to correct the keystone effect, such as by implementing a non-proportional scaling that adjusts and/or re-maps images of the video output. The configuration could also include a virtual background associated with the video output that is deactivated (e.g., no longer blurring a background in the image). The configuration could also include a contrast, sharpness, and/or saturation of an image of the video output that is optimized for the object 804 (e.g., optimized for text of a document). The configuration could also include deactivating a light 878 associated with the camera 870 (e.g., so that the participant 802 is not blinded by the light).

Figure 9:
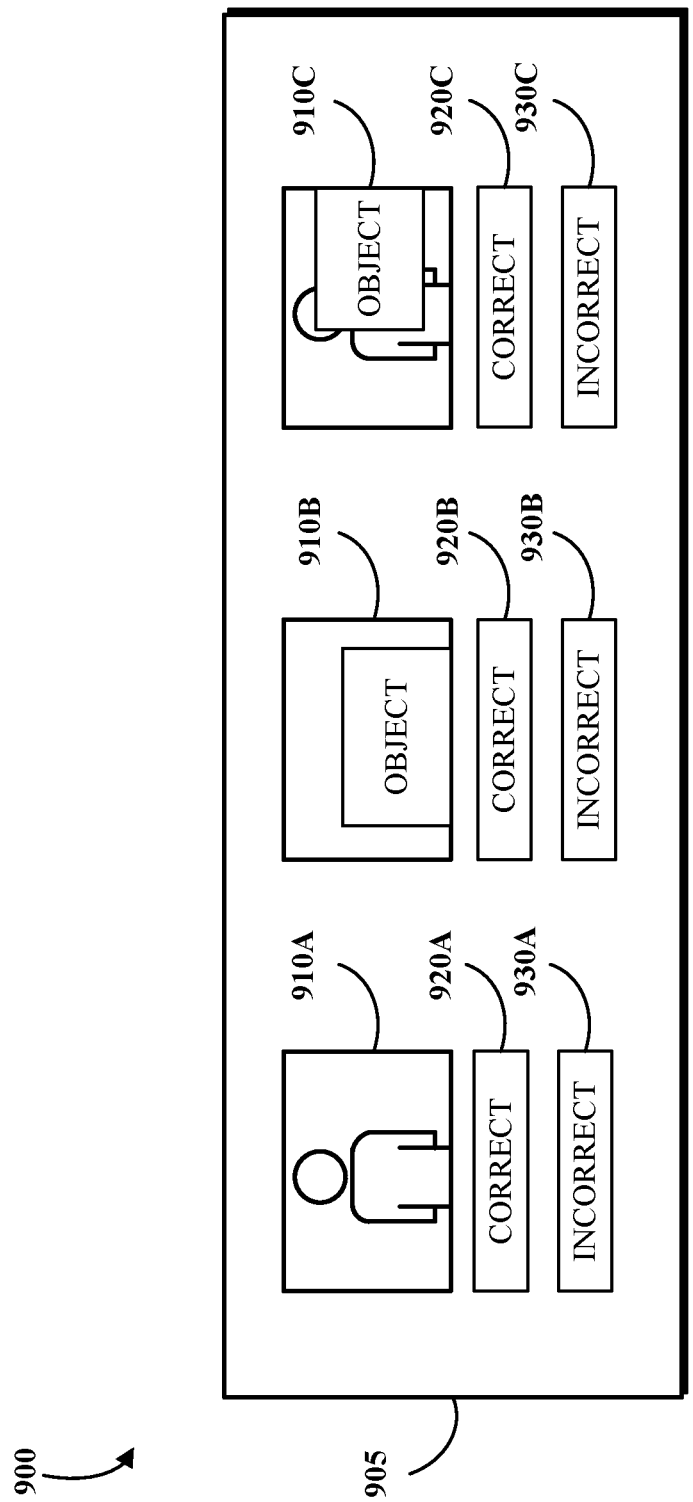
FIG. 9 illustrates an example of a message sent to a participant to obtain feedback associated with one or more configurations of a video output.

FIG. 9 illustrates an example of a message 905 sent to a participant to obtain feedback associated with one or more configurations of a video output. For example, the message 905 may include one or more screenshots or images captured by a camera during a video conference, such as images 910A, 910B, and 910C. The images may be captured by a camera of a communications system like the communications system 430A shown in FIG. 4. For example, the message may be sent to a participant (e.g., a user of participant device 410A) from a server device (e.g., the server device 440) after ending a video conference.

The message may indicate how one or more configurations associated with a video output was adjusted, such as by showing examples via the images 910A, 910B, and 910C. For example, the image 910A could correspond to an image captured in an environment like the environment 600 shown in FIG. 6 (e.g., a first configuration associated with the video output where an image of the video output captures a participant); the image 910B could correspond to an image captured in an environment like the environment 700 shown in FIG. 7 (e.g., a second configuration associated with the video output where an image of the video output captures an object below a participant); and the image 910C could correspond to an image captured in an environment like the environment 800 shown in FIG. 8 (e.g., a third configuration associated with the video output where an image of the video output captures an object in front of a participant). In some implementations, the message 905 may indicate how a trigger event caused an adjustment to the configuration associated with the video output. For example, the message 905 may indicate image 910A was triggered by a movement of the camera; image 910B was triggered by a change in an image of the video output indicating a movement of the camera; and image 910C was triggered by a movement of an object in an image of the video output.

The message 905 may permit the participant to view the images (e.g., the images 910A, 910B, and 910C) and provide input (e.g., feedback) as to whether one or more of the images were captured correctly or incorrectly. For example, the feedback may be provided by replying to the message, or by accessing a website associated with the message, with selection of an agreement (e.g., selecting a "correct" capture of image 910A via prompt 920A, selecting a "correct" capture of image 910B via prompt 920B, or selecting a "correct" capture of image 910C via prompt 920C) or a disagreement (e.g., selecting an "incorrect" capture of image 910A via prompt 930A, selecting a "incorrect" capture of image 910B via prompt 930B, or selecting a "incorrect" capture of image 910C via prompt 930C) for one or more of the images to indicate whether the one or more images were captured correctly or incorrectly. The feedback may then be used (e.g., by the client application 420A) to improve adjusting the configuration associated with the video output, such as for a next video conference. In some implementations, a message, like the message 905, could include snapshots obtained during the video conference which may have been triggered by one or more audio statements given by the participant (e.g., saying "snapshot"). In some implementations, the message 905 may permit the participant to see how a configuration associated with a video output was adjusted in response to a particular trigger event and to provide input (e.g., feedback) as to whether the configuration should adjust differently in response to that trigger event. In some implementations, the message 905 may permit the participant to see one or more configuration options as to how a configuration associated with a video output may be adjusted in response to a particular trigger event and to provide input as to which configuration option should be used in response to that trigger event.

In some implementations, the client application (e.g., the client application 420A) may execute or otherwise use a machine learning model, such as when detecting the trigger event and/or adjusting the configuration. For example, the machine learning model may be trained to determine whether a change in an image of the video output should cause the trigger event and/or may be trained to adjust the configuration associated with the video output. In some implementations, the machine learning model may be trained based on feedback from the message 905.

Figure 10:
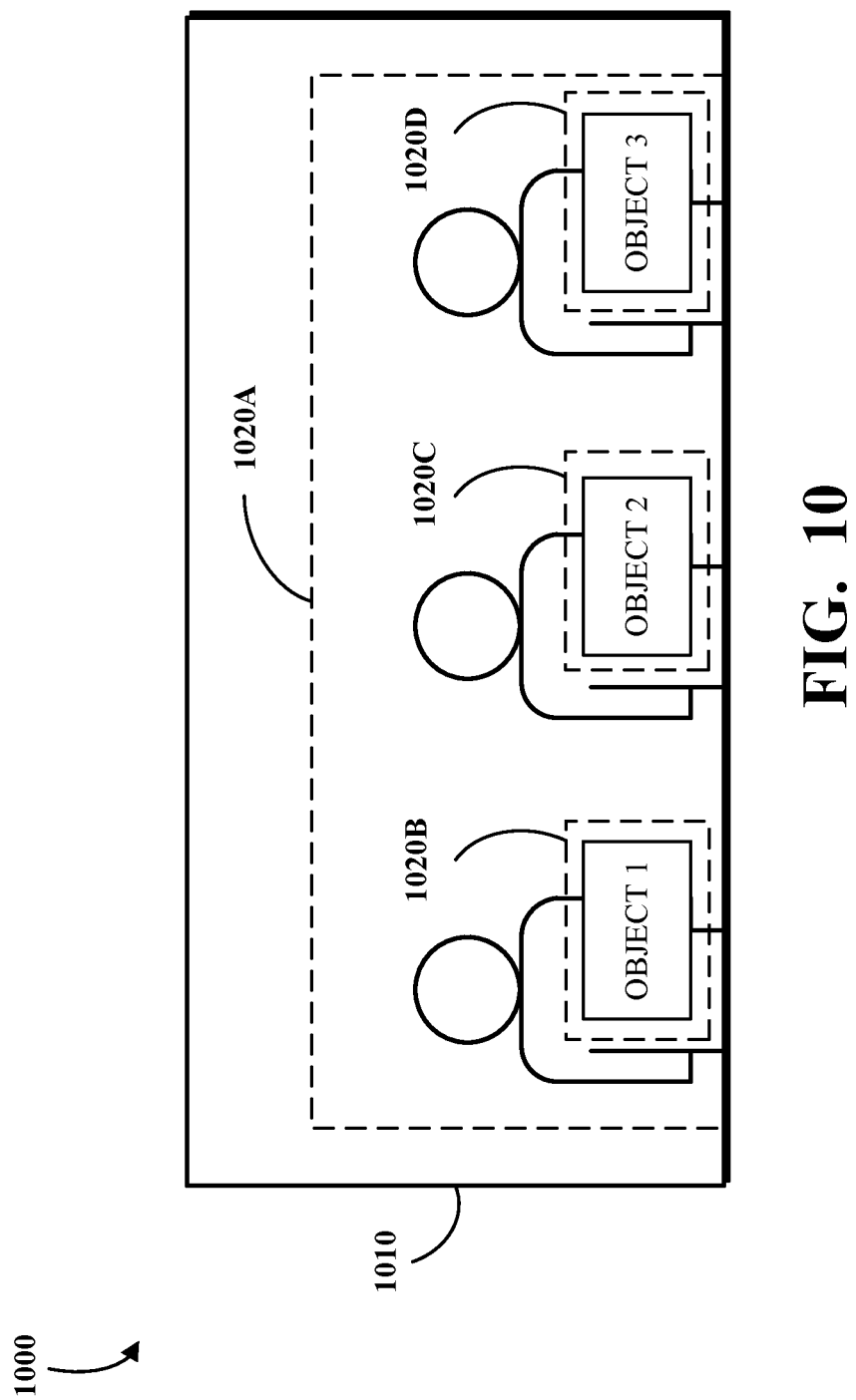
FIG. 10 illustrates an example of a user interface displaying a video output from a camera.

FIG. 10 illustrates an example of a user interface 1000 displaying a video output 1010 from a camera. The camera may capture images of multiple participants and/or objects during a video conference. For example, the video output 1010 may be associated with a user tile associated with a given participant device, such as participant device 410A shown in FIG. 4.

During the video conference, a client application associated with the video output 1010, like a client application shown in FIG. 4 (e.g., the client application 420A), may execute to automatically detect between multiple regions of interest in the video output 1010, such as regions 1020A through 1020D. The client application may dynamically adjust configurations based on changes in the regions of interest. For example, at a first time, the client application may focus on region 1020A (e.g., a focal point or depth of view corresponding to a group of participants). A configuration associated with the video output 1010 when focusing on region 1020A could be a default configuration.

At a second time, the client application may focus on region 1020B (e.g., a focal point or depth of view corresponding to an object in front of a first participant). The client application may adjust the configuration to focus on region 1020B based on a trigger event, such as a motion of an object in region 1020B and/or an audio statement indicating the object in region 1020B (e.g., captured by a microphone like the microphone 582 shown in FIG. 5). In some implementations, a participant may draw a box in an image (e.g., via the user interface) to indicate the region of interest (e.g., the region 1020B). Further, the adjustment of the configuration could include adjusting other parameters, such as blurring the background outside of region 1020B via a virtual background.

At a third time, the client application may focus on region 1020C (e.g., a focal point or depth of view corresponding to an object in front of a second participant). The client application may adjust the configuration to focus on region 1020C based on another trigger event, such as a motion of an object in region 1020C and/or an audio statement indicating the object in region 1020C (e.g., captured by the microphone). In some implementations, a participant may draw a box in an image (e.g., via the user interface) to indicate the region of interest (e.g., the region 1020C).

Further, the adjustment of the configuration could include adjusting other parameters, such as blurring the background outside of region 1020C via a virtual background. The client application may continue to automatically detect between the regions of interest in this way, and adjust configurations based on changes in the regions of interest, during the video conference.

Region of interest processing as disclosed herein may in at least some cases be performed using one or more machine learning models trained for object detection and/or object recognition. For example, a first machine learning model can be trained to detect objects within a video stream and output indications of the detected objects to a second machine learning model trained to recognize those detected objects based on aesthetic, dimensional, and/or other qualities thereof. In another example, a single machine learning model may be trained to both detect objects within a video stream and process those detected objects to recognize them based on aesthetic, dimensional, and/or other qualities thereof. In some cases, the one or more machine learning models used for the object detection and/or recognition may be trained based exclusively on video stream data obtained for a given conference participant for whom the processing disclosed herein is performed, such as to more accurately learn objects specific to the conference participant. In some cases, the one or more machine learning models used for the object detection and/or recognition may be trained based on video stream data obtained for one or more conference participants including one or more conference participants other than the given conference participant.

Figure 11:
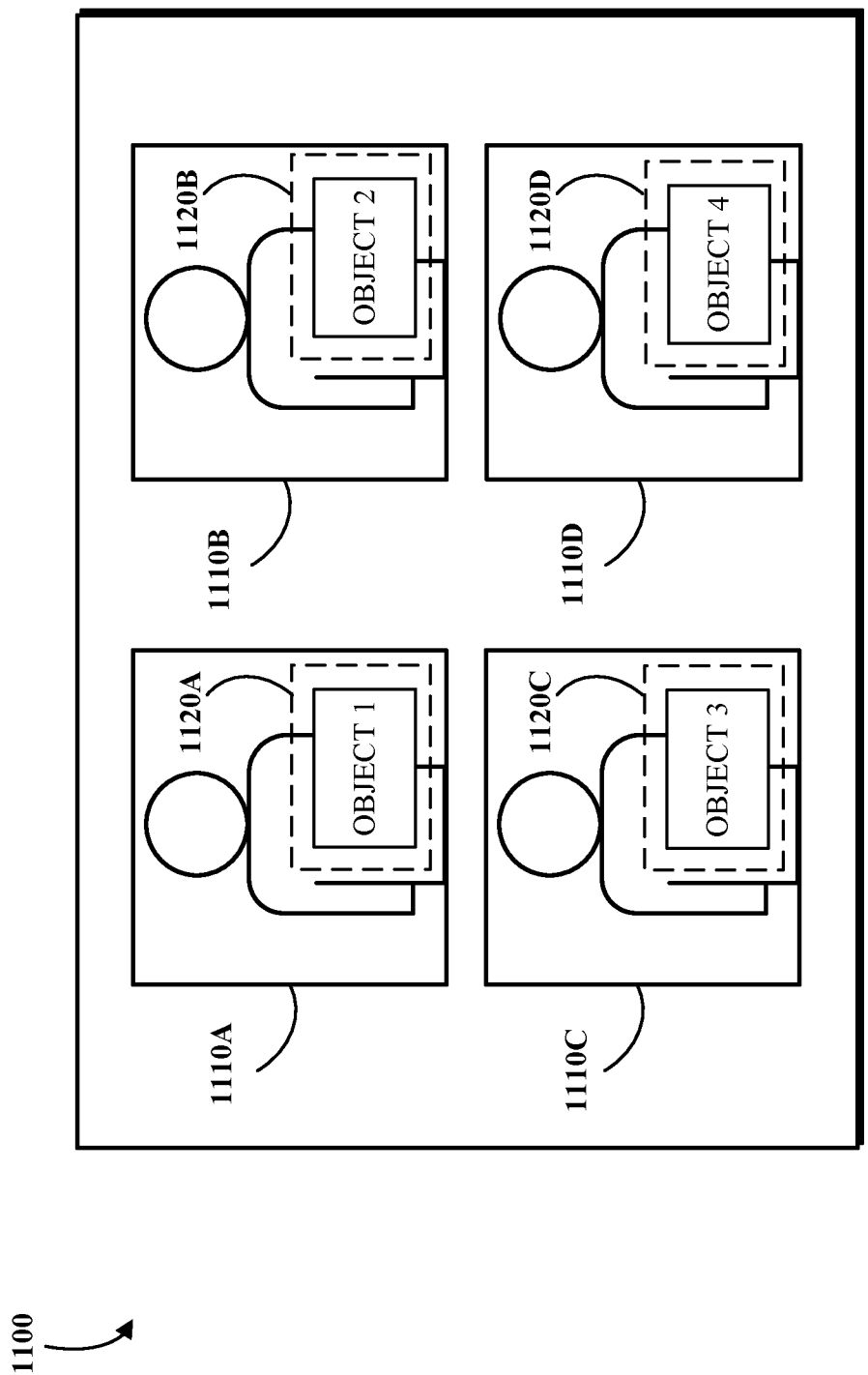
FIG. 11 illustrates an example of a user interface displaying video outputs from separate cameras.

FIG. 11 illustrates an example of a user interface 1100 displaying video outputs from separate cameras, such as video outputs 1110A to 1110D. A video output (e.g., in a user tile) may be associated with a participant device at a remote location, such as video output 1110A associated with a participant device 410A shown in FIG. 4, video output 1110B associated with a participant device 410B shown in FIG. 4, and so forth. The separate cameras may capture images of separate participants and/or objects during a video conference.

During the video conference, a server (e.g., the server device 440 shown in FIG. 4) may cause client applications associated with the video outputs 1110A to 1110D (e.g., the client application 420A associated with participant device 410A, client application 420B associated with participant device 410B, and so forth) to automatically detect regions of interest in video outputs 1110A to 1110D. The server may further cause the client applications associated with the video outputs 1110A to 1110D to dynamically adjust configurations of the video outputs 1110A to 1110D based on changes in the regions of interest. For example, the server may cause the client application associated with the video output 1110A to focus on region 1120A (e.g., a focal point or depth of view corresponding to an object in front of a first participant). The server may cause the client application to adjust the configuration to focus on region 1120A based on a trigger event, such as a motion of an object in region 1120A and/or an audio statement indicating the object in region 1120A (e.g., captured by a microphone like the microphone 582 shown in FIG. 5). In some implementations, a participant may draw a box in an image (e.g., via the user interface 1100) to indicate the region of interest (e.g., the region 1120A). Further, the adjustment of the configuration could include adjusting other parameters, such as blurring the background outside of region 1120A via a virtual background.

In a similar way, the server may cause the client application associated with the video output 1110B to focus on region 1120B (e.g., a focal point or depth of view corresponding to an object in front of a second participant); may cause the client application associated with the video output 1110C to focus on region 1120C (e.g., a focal point or depth of view corresponding to an object in front of a third participant); and so forth. The server may cause the client application to adjust the configurations to focus on the regions (e.g., the regions 1120A to 1120D) based on a same a trigger event. Further, the adjustment of the configurations could include adjusting other parameters in a similar way, such as blurring the background outside of the regions (e.g., the regions 1120A to 1120D) via a virtual background.

Region of interest processing as disclosed herein may in at least some cases be performed using one or more machine learning models trained for object detection and/or object recognition. For example, the region of interest processing may be performed similarly or in the same manner as described above with respect to FIG. 10.

Figure 12:
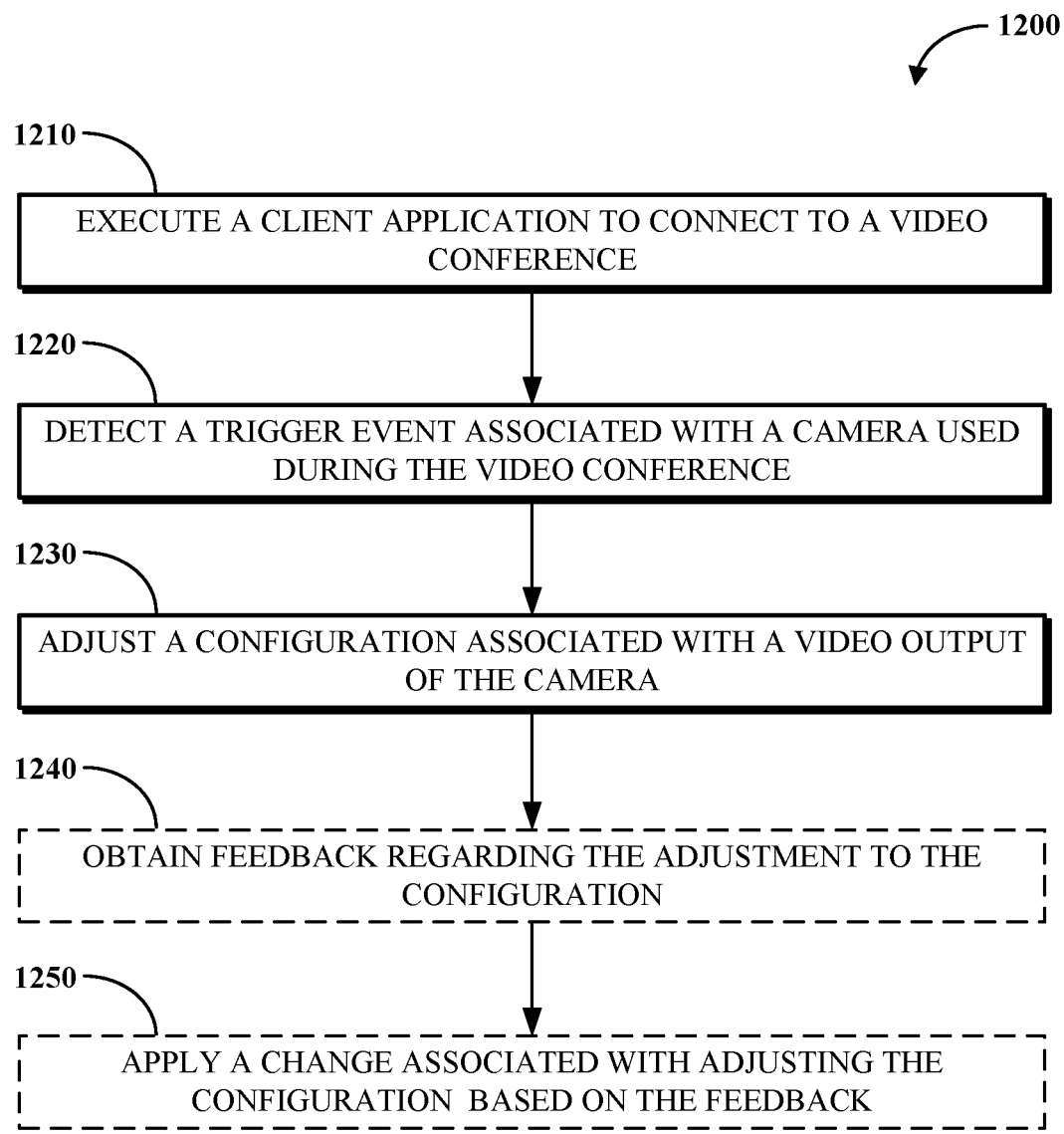
FIG. 12 is a flowchart of an example of a technique for adjusting a configuration associated with a video output during a video conference.

To further describe some implementations in greater detail, reference is next made to examples of techniques which may be performed by or using a system that adjusts a configuration associated with a video output during a video conference. FIG. 12 is a flowchart of an example of a technique 1200 for adjusting a configuration associated with a video output during a video conference. The technique 1200 can be executed using computing devices, such as the systems, hardware, and software described with respect to FIGS. 1-11. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1210, a participant device may execute a client application to connect to a video conference. The participant device may execute a client application like a client application shown in FIG. 4 (e.g., the client application 420A). The participant device may connect to a server to connect to the video conference, like the server device 440 shown in FIG. 4. The participant device may include a communications system like the communications system (e.g., the communications system 430A) shown in FIG. 4. The communications system may include one or more microphones, one or more cameras, one or more speakers, and/or one or more user interfaces.

At 1220, the client application executing on the participant device may detect a trigger event (e.g., a gesture) associated with a camera of the communications system used during the video conference. For example, the trigger event could comprise receiving an input from a sensor indicating a movement of the camera, detecting a change in an image of the video output indicating a movement of the camera, and/or detecting an audio statement via the microphone. The trigger event may cause a configuration (e.g., a setting) associated with the video output from the camera to be adjusted.

At 1230, responsive to detecting trigger event, the client application executing on the participant device may adjust the configuration associated with the video output. For example, adjusting a configuration could comprise changing a focal point associated with the camera, inverting an image of the video output, changing a virtual background associated with the video output, changing a contrast, sharpness, and/or saturation in an image of the video output, activating a light associated with the camera, and the like.

At 1240, a message may be received by the participant to obtain feedback from a participant. For example, the message may include one or more screenshots or images captured by the camera during the video conference. In some implementations, the message could be sent to the participant (e.g., a user of the participant device) from a server device (e.g., the server device 440 shown in FIG. 4) after ending a video conference. The message may indicate how a configuration associated with the video output was adjusted, such as by showing examples via screenshots or images. In some implementations, the message may indicate how a trigger event caused an adjustment to the configuration associated with the video output. The message may permit the participant to view the images and provide input as to whether the images were captured correctly or incorrectly. For example, the feedback may be provided by replying to the message, or accessing a website associated with the message. Steps or operations at 1240 may be optional, and in some implementations, might not be performed.

At 1250, responsive to receiving the feedback, the client application may execute to apply the feedback to improve adjusting the configuration associated with the video output, such as for a next video conference. The client application may apply the feedback to change how a configuration may be adjusted. In some implementations, the client application may apply the feedback to further train a machine learning model to determine whether a movement of a camera and/or a change in an image of the video output (e.g., a movement of an object) should automatically cause a trigger event and/or to determine how to adjust the configuration associated with the video output. That is, the feedback may be used to set up a behavior to capture a participant's intent. Steps or operations at 1250 may be optional, and in some implementations, might not be performed.

Figure 13:
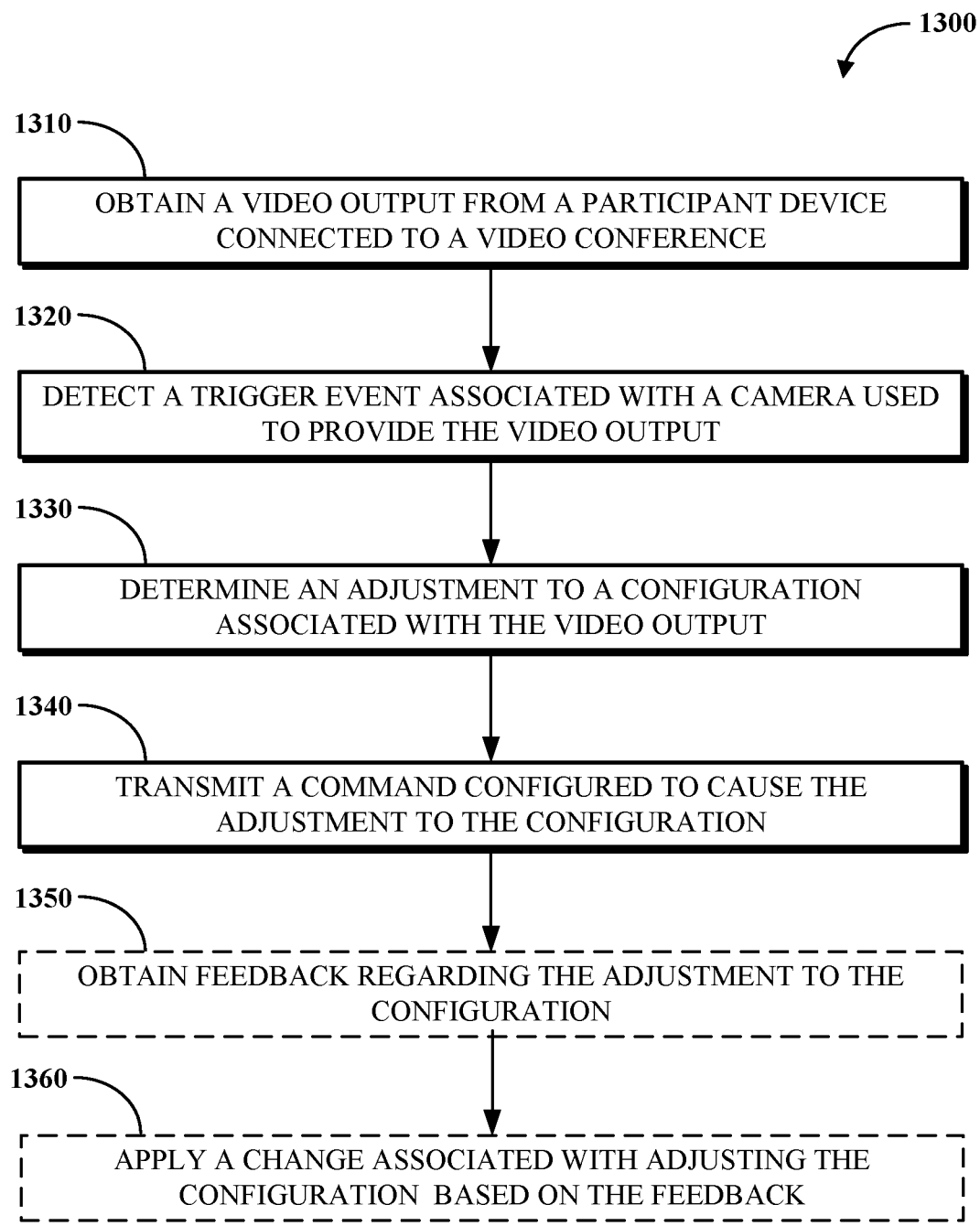
FIG. 13 is a flowchart of another example of a technique for adjusting a configuration associated with a video output during a video conference.

FIG. 13 is a flowchart of another example of a technique 1300 for adjusting a configuration associated with a video output during a video conference. The technique 1300 can be executed using computing devices, such as the systems, hardware, and software described with respect to FIGS. 1-11. The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1310, a server may obtain a video output from a participant device connected to a video conference (e.g., via a client application executing on a participant device). The server may be like the server device 440 shown in FIG. 4. The participant device may include a client application and a communications system like the client application and the communications system shown in FIG. 4 (e.g., the client application 420A and the communications system 430A). The communications system may include one or more microphones, one or more cameras, one or more speakers, and/or one or more user interfaces.

At 1320, the server may detect a trigger event (e.g., a gesture) associated with a camera of a communications system used by a participant device during the video conference. For example, the trigger event could comprise receiving an input from a sensor indicating a movement of the camera, detecting a change in an image of the video output indicating a movement of the camera, and/or detecting an audio statement via the microphone. The trigger event may cause a configuration (e.g., a setting) associated with the video output from the camera to be adjusted.

At 1330, responsive to detecting a trigger event, the server may determine an adjustment of the configuration associated with the video output for the participant device. For example, adjusting a configuration could comprise changing a focal point associated with the camera, inverting an image of the video output, changing a virtual background associated with the video output, changing a contrast, sharpness, and/or saturation in an image of the video output, activating a light associated with the camera, and the like.

At 1340, the server may transmit a command to the client application (e.g., instructions, data, or other information which can be processed by the client application) that is configured to cause the client application to apply the adjustment of the configuration associated with the video output. The client application executing on the participant device may adjust the configuration associated with the video output. For example, adjusting a configuration could comprise changing a focal point associated with the camera, inverting an image of the video output, changing a virtual background associated with the video output, changing a contrast, sharpness, and/or saturation in an image of the video output, activating a light associated with the camera, and the like.

At 1350, the server may send a message to the participant to obtain feedback from a participant. For example, the message may include one or more screenshots or images captured by the camera during the video conference. In some implementations, the message could be sent to the participant (e.g., a user of the participant device) from a server device (e.g., the server device 440 shown in FIG. 4) after ending a video conference. The message may indicate how a configuration associated with the video output was adjusted, such as by showing examples via screenshots or images. In some implementations, the message may indicate how a trigger event caused an adjustment to the configuration associated with the video output. The message may permit the participant to view the images and provide input as to whether the images were captured correctly or incorrectly and/or whether the trigger event was detected correctly or incorrectly. For example, the feedback may be provided by replying to the message, or by accessing a website associated with the message. Steps or operations at 1350 may be optional, and in some implementations, might not be performed.

At 1360, responsive to receiving the feedback, the server may execute to apply the feedback to improve adjusting the configuration associated with the video output for the client application, such as for a next video conference. The server may apply the feedback to change how a configuration may be adjusted. In some implementations, the server may apply the feedback to further train a machine learning model to determine whether a movement of a camera and/or a change in an image of the video output (e.g., a movement of an object) should automatically cause a trigger event and/or to determine how to adjust the configuration associated with the video output. That is, the feedback may be used to set up a behavior to capture a participant's intent. Steps or operations at 1360 may be optional, and in some implementations, might not be performed.

Some implementations may include a method that includes: detecting a trigger event by a client application connected to a video conference, wherein the client application is associated with a communications system used during the video conference, and wherein the communications system includes a microphone that generates an audio output and a camera that generates a video output with the trigger event being associated with the camera; and responsive to detecting the trigger event, adjusting a configuration associated with the video output. In some implementations, detecting the trigger event may include receiving an input from a sensor indicating a movement of the camera. In some implementations, detecting the trigger event may include detecting a change in an image of the video output indicating a movement of the camera. In some implementations, detecting the trigger event may include detecting an audio statement via the microphone. In some implementations, detecting the trigger event may include detecting a movement of an object in an image of the video output. In some implementations, detecting the trigger event may include using a machine learning model, wherein the machine learning model determines whether a change in an image of the video output should cause the trigger event. In some implementations, adjusting the configuration may include at least one of: changing a focal point associated with the camera; inverting an image of the video output; or changing a virtual background associated with the video output. In some implementations, the method may include using a machine learning model to adjust the configuration, wherein the machine learning model determines whether to adjust at least one of: a focal point associated with the camera; an orientation of an image of the video output; a keystone adjustment of an image of the video output; or a virtual background associated with the video output. In some implementations, adjusting the configuration may include changing a region of interest in an image of the video output. In some implementations, the method may include sending a message indicating how the configuration associated with the video output was adjusted, wherein the message is sent after ending the video conference, and wherein the message includes at least one image from the video output that reflects the configuration as adjusted during the video conference.

Some implementations may include an apparatus that includes a communications system including a camera configured to generate a video output and a microphone configured to generate an audio output; a memory; and a processor configured to execute instructions stored in the memory to: connect to a video conference; detect a trigger event by a client application connected to the video conference, wherein the client application is associated with the communications system used during the video conference, and wherein the trigger event is associated with the camera; and responsive to detecting the trigger event, adjust a configuration associated with the video output. In some implementations, detecting the trigger event may include receiving an input from a sensor indicating a movement of the camera. In some implementations, detecting the trigger event may include detecting a change in an image of the video output indicating a movement of the camera. In some implementations, adjusting the configuration may include at least one of: changing a focal point associated with the camera; inverting an image of the video output; or changing a virtual background associated with the video output. In some implementations, the instructions may include instructions to send a message indicating how the configuration associated with the video output was adjusted, wherein the message is sent after ending the video conference, and wherein the message includes at least one image from the video output that reflects the configuration as adjusted during the video conference.

Some implementations may include a non-transitory computer readable medium that stores instructions operable to cause one or more processors to perform operations that include: detecting a trigger event by a client application connected to a video conference, wherein the client application is associated with a communications system used during the video conference, and wherein the communications system includes a microphone that generates an audio output and a camera that generates a video output with the trigger event being associated with the camera; and responsive to detecting the trigger event, adjusting a configuration associated with the video output. In some implementations, detecting the trigger event may include receiving an input from a sensor indicating a movement of the camera. In some implementations, detecting the trigger event may include detecting the trigger event may include detecting a change in an image of the video output indicating a movement of the camera. In some implementations, adjusting the configuration may include at least one of: changing a focal point associated with the camera; inverting an image of the video output; or changing a virtual background associated with the video output. In some implementations, the operations may include sending a message indicating how the configuration associated with the video output was adjusted, wherein the message is sent after ending the video conference, and wherein the message includes at least one image from the video output that reflects the configuration as adjusted during the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting a trigger event by a client application connected to a video conference, wherein the client application is associated with a communications system used during the video conference, wherein the communications system includes a camera that generates a video output, and wherein the trigger event is associated with the camera;
   responsive to detecting the trigger event, adjusting a configuration associated with the video output by dynamically changing a virtual background to deemphasize areas outside a region of interest within the video output and either changing a focal point associated with the camera or inverting an image of the video output, wherein the region of interest is selected based on detecting a participant or an object movement within the video output by a machine learning model trained to capture an intent of the participant;
   sending a message indicating how the configuration associated with the video output was adjusted, wherein the message includes at least one image from the video output that reflects the configuration as adjusted during the video conference; and
   training, based on feedback received with respect to the message, the machine learning model to more accurately capture the intent of the participant when adjusting the configuration.

2. The method of claim 1, wherein detecting the trigger event comprises:
   receiving an input from a sensor indicating a movement of the camera.

3. The method of claim 1, wherein detecting the trigger event comprises:
   detecting a change in an image of the video output indicating a movement of the camera.

4. The method of claim 1, wherein detecting the trigger event comprises:
   detecting an audio statement via a microphone of the communications system.

5. The method of claim 1, wherein detecting the trigger event comprises:
   detecting a movement of an object in an image of the video output.

6. The method of claim 1, wherein detecting the trigger event comprises:
   using a machine learning model, wherein the machine learning model determines whether a change in an image of the video output should cause the trigger event.

7. The method of claim 1, wherein the machine learning model determines whether to adjust at least one of:
   a focal point associated with the camera;
   an orientation of an image of the video output; or
   the virtual background.

8. The method of claim 1, wherein adjusting the configuration comprises:
   changing a region of interest in an image of the video output.

9. The method of claim 1, wherein the message is sent after ending the video conference.

10. An apparatus, comprising:
    a communications system including a camera configured to generate a video output;
    a memory; and
    a processor configured to execute instructions stored in the memory to:
      connect to a video conference;
      detect a trigger event by a client application connected to the video conference, wherein the client application is associated with the communications system used during the video conference, and wherein the trigger event is associated with the camera;
      responsive to detecting the trigger event, adjust a configuration associated with the video output by dynamically changing a virtual background to deemphasize areas outside a region of interest within the video output and either changing a focal point associated with the camera or inverting an image of the video output, wherein the region of interest is selected based on detecting a participant or an object movement within the video output by a machine learning model trained to capture an intent of the participant;

send a message indicating how the configuration associated with the video output was adjusted, wherein the message includes at least one image from the video output that reflects the configuration as adjusted during the video conference; and train, based on feedback received with respect to the message, the machine learning model to more accurately capture the intent of the participant when adjusting the configuration.

11. The apparatus of claim 10, wherein detecting the trigger event comprises:

receiving an input from a sensor indicating a movement of the camera.

12. The apparatus of claim 10, wherein detecting the trigger event comprises:

detecting a change in an image of the video output indicating a movement of the camera.

13. The apparatus of claim 10, wherein the message is sent after ending the video conference.

14. The apparatus of claim 10, wherein the machine learning model determines whether to adjust at least one of:

a focal point associated with the camera;

an orientation of an image of the video output; or the virtual background.

15. The apparatus of claim 10, wherein adjusting the configuration comprises changing a region of interest in an image of the video output.

16. A non-transitory computer readable medium storing instructions operable to cause one or more processors to perform operations comprising:

detecting a trigger event by a client application connected to a video conference, wherein the client application is associated with a communications system used during the video conference, wherein the communications system includes a camera that generates a video output, and wherein the trigger event is associated with the camera;

responsive to detecting the trigger event, adjusting a configuration associated with the video output by dynamically changing a virtual background to deemphasize areas outside a region of interest within the video output and either changing a focal point associated with the camera or inverting an image of the video output, wherein the region of interest is selected based on detecting a participant or an object movement within the video output by a machine learning model trained to capture an intent of the participant;

sending a message indicating how the configuration associated with the video output was adjusted, wherein the message includes at least one image from the video output that reflects the configuration as adjusted during the video conference; and training, based on feedback received with respect to the message, the machine learning model to more accurately capture the intent of the participant when adjusting the configuration.

17. The non-transitory computer readable medium storing instructions of claim 16, wherein detecting the trigger event comprises:

receiving an input from a sensor indicating a movement of the camera.

18. The non-transitory computer readable medium storing instructions of claim 16, wherein detecting the trigger event comprises:

detecting a change in an image of the video output indicating a movement of the camera.

19. The non-transitory computer readable medium storing instructions of claim 16, wherein the message is sent after ending the video conference.

20. The non-transitory computer readable medium storing instructions of claim 16, wherein the machine learning model determines whether to adjust at least one of:

a focal point associated with the camera;

an orientation of an image of the video output; or the virtual background.

* * * * *